(12) United States Patent
Laflen et al.

(10) Patent No.: US 8,010,578 B2
(45) Date of Patent: Aug. 30, 2011

(54) METHOD OF REFACTORING A RUNNING DATABASE SYSTEM

(75) Inventors: James D. Laflen, Bellevue, WA (US); Jason D. Clark, Woodinville, WA (US); Gerrit Erwin Randolph Drapers, Bellevue, WA (US); Liangxiao Zhu, Issaquah, WA (US); Amy L. Myhre, Redmond, WA (US); Duncan L. Davenport, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 12/163,790

(22) Filed: Jun. 27, 2008

(65) Prior Publication Data

US 2009/0327324 A1    Dec. 31, 2009

(51) Int. Cl.
*G06F 7/00* (2006.01)
*G06F 17/30* (2006.01)
*G06F 9/44* (2006.01)
*G06F 15/16* (2006.01)

(52) U.S. Cl. ........ 707/804; 707/806; 717/105; 717/135; 717/170

(58) Field of Classification Search .................. 707/805, 707/804, 806; 717/105, 135, 170
See application file for complete search history.

(56) References Cited

U.S. PATENT DOCUMENTS

| | | | |
|---|---|---|---|
| 5,581,797 A | 12/1996 | Baker et al. | |
| 6,115,704 A * | 9/2000 | Olson et al. | 707/3 |
| 6,356,285 B1 | 3/2002 | Burkwald et al. | |
| 6,609,133 B2 | 8/2003 | Ng et al. | |
| 6,698,013 B1 | 2/2004 | Bertero et al. | |
| 7,610,545 B2 * | 10/2009 | Wagner et al. | 715/200 |
| 7,743,020 B2 * | 6/2010 | Kelly et al. | 707/610 |
| 2003/0212647 A1 | 11/2003 | Bangel et al. | |
| 2004/0153463 A1 * | 8/2004 | Sasai et al. | 707/100 |
| 2007/0112808 A1 | 5/2007 | Howard et al. | |
| 2007/0198697 A1 * | 8/2007 | Abernethy et al. | 709/224 |
| 2008/0059449 A1 * | 3/2008 | Webster et al. | 707/5 |
| 2009/0037873 A1 * | 2/2009 | Ahadian et al. | 717/105 |

OTHER PUBLICATIONS

Xue, et al., A Multi-Versioning Algorithm for Intention Preservation in Distributed Real-Time Group Editors. In Twenty-Fifth Australian Computer Science Conference (ACSC2003), Adelaide, Australia, 10 pages.
Opdyke. Refactoring Object-Oriented Frameworks, PhD Thesis, 1992, 206 pages.
Arnold. Software Restructuring, in Proceedings of the IEEEE, vol. 77, No. 4, Apr. 1989, 11 pages.
Henry, et al., DB2 Change Management Expert, Part: Database version control with DB2 Change Management Expert, Enhance Collaboration and Ensure an Audit Path, Apr. 26, 2007, 12 pages.
Hou, et al., Using SCL to Specify and Check Design Intent in Source Code, published online Jun. 23, 2006, 20 pages.

* cited by examiner

*Primary Examiner* — Greta L Robinson
*Assistant Examiner* — Brian E Weinrich
(74) *Attorney, Agent, or Firm* — Workman Nydegger

(57) ABSTRACT

A database development system is provided. The system includes a current-state source representation of a database that can be captured in a model of the database and a metadata component that preserves user intentions describing when a user interacts with the system to perform a refactoring operation (or other code enhancement) for use in subsequent operations by the system. A deployment component is provided that utilizes the preserved user intentions to optimize behavioral upgrades to the system, where simulations can be run against the model to facilitate efficient and automated deployments.

17 Claims, 9 Drawing Sheets

METHOD OF REFACTORING A RUNNING DATABASE SYSTEM

BACKGROUND

The state-of-the-art of iterative development tooling for database development is inadequate as compared to the tooling available for application development. Since the general concepts embodied in application development tools (such as source code control, unit testing, or debugging) are well-understood by the software development community, it is perplexing why equivalent capabilities for database development have not similarly emerged. One reason may stem from the different techniques in which production software (applications and databases) are developed, managed, and enhanced.

In the application world, code is written, a binary is produced, and the binary is put into service. The source code for the product provides an accurate current-state representation of the machine code being executed within the binary. When it is time to modify the product, the source code is appropriately changed and a new binary is produced. Execution of the previous binary is stopped or shutdown, the new binary is inserted in place of the old representation, and execution is restarted. This process has two important characteristics: First, the source code for the modified product still provides an accurate present-state representation of the machine code being executed within the binary (i.e., the source code directly shows the amalgam of the old and new code contained in the binary). Secondly, the upgrade process is a direct "cut and replace" of the old binary with the new.

In contrast, databases represent a class of software that can continue to run even while changes are being applied. Database developers and administrators can take advantage of this capability to modify database systems while running so as to minimize the impact of database availability on users. Initially, database code is written and, when executed, the code creates the first version of the operational database system. At the moment of creation, the database source code provides an accurate offline representation of the system being executed. Since changes to database software are performed while the system is running, updated database systems are seldom produced by creating a new database from scratch that replaces the old database. Most commonly, new code is written that modifies the old database system to the desired new state. At this point, the database source code (the original creation code plus the modification code) no longer provides a direct current-state representation of the database system being executed. As a result, the source code-based tooling concepts used in application development, which depend on the source code declaring the present state of the executing system, cannot be readily applied to database software development.

To enable the ability to modify a database system while it is running, the database management system (DBMS) itself must provide a means of changing the system. For instance, the use of ALTER statements typifies the support provided in common systems. More-advanced support for limited refactoring operations may also be provided, where refactoring is the process of updating the behavioral aspects of the database system. For example, one style of SQL Server enables the ability to rename a table column in an existing system by making a call to a rename function. In this example, the degree of refactoring support is limited and does not update references to the renamed object by programmability objects. Nonetheless, the system function enables an otherwise-impossible action, which in this example is the preservation of the data represented by the column. Tools can significantly improve upon the built-in refactoring facilities of a DBMS. Improvements include finding other objects impacted by the refactoring, and appropriately updating them to reflect the change. This type of support is still inadequate however for modern systems that evolves over time.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Systems and methods are provided to manage refactoring operations in an efficient manner, where refactoring includes updating an underlying behavioral semantic (source code) of a database or other structure of a running system. A development paradigm similar to an application development system is provided that enables developers to employ an offline source code representation as a model of a running system. The model can be derived from an automated analysis of the running system. The model can then be managed and updated via source control techniques applied in other areas of application development. Various aspects are provided to support the offline representation. In one aspect, user intentions are captured and analyzed as changes are made to the model and/or the database over time. Such intentions (e.g., what changes were actually intended for a particular design) are employed to resolve ambiguities of desired changes to the running system and to facilitate efficient deployment of the changes to the system. In a subsequent aspect, deployment of design changes can be facilitated by testing and simulating potential changes against the model.

When modifying a particular design, the offline source code representation can be changed by the developer. A problem can arise, however, when modifications of a database schema are performed over time, in various user sessions, possibly by different end-users, and before design results are ultimately applied to the running database system. In this environment, a change that occurred in the past may be difficult to distinguish between multiple alternatives at the moment of application to a database management system (DBMS), for example. Thus, ambiguities may arise between the current state of the system and the incremental changes that have been applied to the model overtime. For example, it may be difficult to distinguish whether an object rename should result in a call to a rename function, or whether such operation reflects the deletion of one object and the creation of an unrelated object.

To resolve ambiguity, components are provided to enable preservation of intent that collects and stores metadata regarding the changes being made to the system, so as to retain the critical refactoring knowledge within the source control system. In the object-rename example, the knowledge that a rename had occurred is captured by the system as the change was made; where such captured information is retained as metadata within the system. When it is time to deploy the modified system, the captured intent behind the change (represented in metadata) is employed to intelligently build the modification code to perform the change. This capability frees developers from having to manually remember and apply such modifications. Instead, the database developer can continue to work with a source code representation—similar to the application developer, at all points in the software lifecycle.

The deployment aspects can include publication of a sequence of commands sufficient to modify the target database server, wherein a schema associated therewith matches that of the source—(e.g., the publication can include: commands being sent to the target database server for subsequent execution, wherein the server's schema can be brought into agreement with the source; scripting commands to a text file in predetermined location, such as a well defined location wherein end users can review such commands, followed by sending them to a target server for execution at a subsequent time.) Hence, deployment can involve changing the target database such that it reflects the current-state source representation. In a related aspect, during a process of producing changes for execution at deployment, the model of a target is changed in order to reflect the preserved intent (e.g., a speculative change), wherein such model can represent a data structure that facilitates analysis for state of affairs related to execution of changes to the target. As such, before actually executing changes to the target system, a speculative change is performed on the model for the target that reflects an intended outcome that is desired. Such speculative change to the target model can suppress unwanted changes resulting from direct comparison of the source and target models. Hence, models for both the source representation and the target representation can be analyzed to produce appropriate changes.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A software development tool is provided, where user intentions are captured over time, modeled in the tool, and utilized to facilitate efficient deployment of code to update a system such as a database or during a software installation process for example. In one aspect, a database development system is provided. The system includes a current-state source representation of a database that can be captured in a model of the database and a metadata component that preserves user intentions describing when a user interacts with the system to perform a refactoring operation (or other code enhancement) for use in subsequent operations by the system. A deployment component is provided that utilizes the preserved user intentions to optimize or otherwise improve production of a sequence of commands to modify a schema associated with a target database for a comparison with the current-state source representation. A persisted representation of user intentions for clarification of ambiguous operations can also be provided. A user interface in form of a menu, button or similarly precise user interface element facilitates the execution of a change to the current-state source representation as well as indication of the user's intent.

As used in this application, the terms "component," "analyzer," "model," "metadata," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal).

Figure 1:
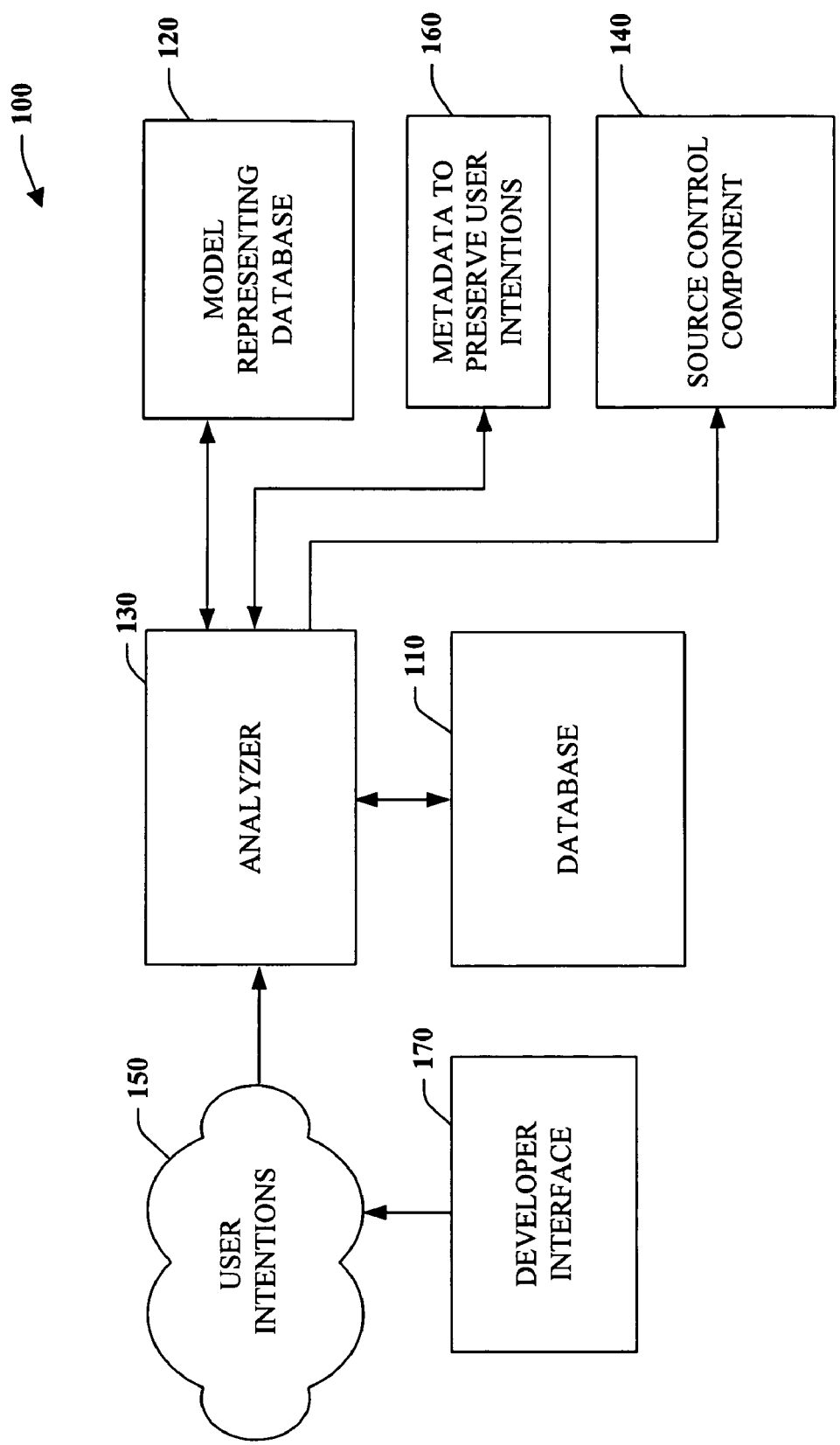
FIG. 1 illustrates a block diagram of an automated refactoring system that preserves user intent.

Referring initially to FIG. 1, an automated refactoring system 100 is provided that preserves user intent to facilitate design and maintenance of a database 110. The system 100 is employed to manage refactoring operations (or other code changes such as code installations) in an efficient manner, where refactoring includes updating an underlying behavioral semantic (source code) of the database 110 or other structure of the running system 100 while maintaining informational semantics (preserving the data without alteration). A development paradigm similar to an application development system is provided that enables developers to employ an offline source code representation as a model 120 of a running system or database 110. The model 120 can be derived from an automated analysis of the database 110 via an analyzer 130. The model 120 can then be managed and updated via a source control component 140. For example, source code can be checked in and out of the source control component 140, where differences are tracked and recorded between various versions of code.

Various aspects are provided to support the offline representation or model 120. In one aspect, user intentions 150 are captured and analyzed as changes are made to the model 120 and/or the database 110 over time. Such intentions 150 (e.g., what changes were actually intended for a particular design) are employed to resolve ambiguities of desired changes to the database 110 and to facilitate efficient deployment of the changes to the system 100. In a subsequent aspect, deployment of desired design changes are facilitated by testing and simulating potential changes against the model 120, where the deployment aspects are described in more detail below respect to FIGS. 3 and 4.

When modifying a particular database design, the offline source code representation or model 120 can be changed by the developer. A problem can arise, however, when modifications of an associated database schema (not shown) are performed over time, in various user sessions, possibly by different end-users, and before design results are ultimately applied to the running database system 100. In this environment, a change that occurred in the past may be difficult to distinguish between multiple alternatives at the moment of application to a database management system (DBMS), for example. Thus, ambiguities may arise between the current state of the system and the incremental changes that have been applied to the model 120 over time. For example, it may be difficult to distinguish whether an object rename should result in a call to a rename function, or whether such operation reflects the deletion of one object and the creation of an unrelated object.

To resolve ambiguity, components are provided to enable preservation of intent 150 that collects and stores metadata 160 regarding the changes being made to the system, so as to retain the critical refactoring knowledge within the source control component 140. In the object-rename example, the knowledge that a rename had occurred is captured by the system as the change was made; where such captured information is retained as the metadata 160 within the system 100. When it is time to deploy the modified system to the database 110, the captured intent 150 behind the change (represented in metadata 160) is employed to intelligently build the modification code to perform the change. This capability frees developers from having to manually remember and apply such modifications. Instead, the database developer can continue to work with a source code representation or model 120—similar to the application developer, at all points in the software lifecycle.

As shown, a developer interface 170 can be monitored to determine user intentions 150, where such intentions can be key strokes or other commands that note the changes desired for the database 110 over time. It is to be appreciated that intent 150 can be captured explicitly by monitoring the developer interface 170. It is also to be appreciated that implicit techniques such as classifiers, learning components, or other artificial intelligence techniques can monitor user actions and infer intentions. As can be appreciated, a combination of explicit and/or implicit techniques for determining intent 150 can be employed.

In general, the system 100 enables the database developer to utilize the same development and enhancement paradigm available to the application developer, namely to use an offline source code representation or model 120 as a visualization of the running system and as a basis for software modification through all phases of the software lifecycle. As noted above, the database development lifecycle begins with the creation of the original source code. At any point thereafter, the design of the running system may have diverged from that original source code base (for example, by direct use of the ALTER statement). The analyzer 130 solves this problem by reverse-engineering (e.g., analyzing the constituent components of the database and generating the model there from) the running system or database 110 to produce an accurate source code representation of the current system. This source code representation or model 120 may be managed using techniques common to application code (e.g., source code control, code quality analysis, and so forth).

As part of the process of building the modification code, the system 100 leverages services provided by the specific database 110 being used (e.g., Oracle) to take advantage of any specialized functionality available within that product. In an SQL Server, for example, an efficient sp_rename procedure can be provided that would utilize such knowledge to select the use of sp_rename instead of DROP and ADD for example. This process is similar in its effect to processor-specific optimizations that compilers often employ.

It is noted that the source code representation of the database 110 can be referred to as a project. Since the project is source code, it is proper to speak of the project in normal software development terms. For example, the project can be checked into source code control at 140, it can be edited, it can be diff'ed (compared with another project to determine the differences), and so forth. The project can be initially created directly in an editor at 170 but most commonly, it will have been created by the reverse-engineering of a production database, called the source database 110. As is the case for an application software component, the project can be comprised, in physical terms, of a number of source code files representing individual objects in the project.

A project can be built, which is the operation of gathering-together, into a single script called the build output, all of the source code for all of the objects in the database 110. This script represents a complete snapshot of the current state of the database modeled by the project. It is possible to translate the build output into creation scripts used to create a physical database that is logically equivalent to the database modeled by the project. However, as mentioned earlier, the most common case is that an existing database, called the target database 110, needs to be modified to bring it into alignment with the logical database or model 120 represented by the build output. The specific steps required to achieve this end depend on the state of the target database 110. For example, if a table in the build output already exists in identical form in the target database 110, it is unnecessary (in fact, undesirable) to DROP the existing table and CREATE a new table that is exactly the same. The process of comparing the build output with the target database and developing the necessary modification script to align them is referred to as deployment. In general terms, the deployment process consists of reverse-engineering the target database into a model representation 120, comparing that representation with a model of the build output and devising the series of operations necessary to synchronize the two.

Generally, a project for the database 110 already exists. The project may have optionally been checked into the source code control system 140, where the user is currently in the process of modifying it. Typically, any modification whose nature is not inherently evident in the resulting modified source code is referred to as a refactoring operation. When the user has completed modifying the model 120, the changes can be checked back into the source code control system or component 140. When the check-in is complete, the model 120 can be built and then deployed to a selected target database 110.

Before proceeding, various high-level methods are described that are supported by the system 100 and the systems described below. In one aspect, a method for capture of user intent 150 is provided regarding certain modifications of database source code, at about the moment the modification occurs. The modifications of interest are those that can subsequently become ambiguous because the user's intent is not inherently reflected in the modified code. In the previous example, the user's intent may have been to explicitly rename a column, rather than to drop the column and add a similar new column of a different name. However, this intent is not apparent in the modified source. As detailed in the description below, this intent can be captured at the time the user chooses, via the user interface 170, to perform a rename operation in this example.

Another method preserves user intent 150 regarding these modifications of the database source code as metadata 160 that is stored offline. A method of discovery can be provided for which actions are to be acted upon at deployment time. This includes a method for applying the user intent 150 while generating the modification code to synchronize the running database 110 system with changes to the database source code or model 120. Yet another method is provided for collapsing multiple changes into a single more efficient change. Another method provides for producing "fallout actions" required by refactoring changes, for example. This includes a method for collapsing "fallout actions" into a single more efficient action. As will be discussed in more detail below, a method of enabling extensibility by third-parties can be provided to implement additional modification actions that can also participate in the system 100. Another method provides for assuring human readability and merge-ability of persistent intent.

It is noted that the database 110 can be a complex model based database structure, wherein an item, a sub-item, a property, and a relationship are defined to allow representation of information within a data storage system as instances of complex types. For example, the database 110 can employ a set of basic building blocks for creating and managing rich, persisted objects and links between objects. An item can be defined as the smallest unit of consistency within the database 110, which can be independently secured, serialized, synchronized, copied, backup/restored, and the like. Such item can include an instance of a type, wherein all items in the database 110 can be stored in a single global extent of items. Furthermore, the database 110 can be based upon at least one item and/or a container structure, and can act as a storage platform exposing rich metadata that is buried in files as items. Moreover, the database 110 can employ a container hierarchical structure, wherein a container is an item that can contain at least one other item. Such containment concept can be implemented via a container ID property inside the associated class, wherein the store can also be a container in form of a physical organizational and manageability unit. In addition, the store represents a root container for a tree of containers within the hierarchical structure.

It is to be appreciated that although the system 100 has been described in terms of refactoring of databases, that the concepts of capturing user intent 150 and employing such intent with a software deployment engine can be applied to other types of systems. For instance, software installation routines could also exploit such concepts, where the captured intent drives an install engine to only install those components that are indicated from the captured intent. For instance, intent may show that one small subset of an install had previously occurred, where a future install rather than updating the entire source would only update those portions of the install that were not previously modified by past user actions or decisions. In yet another aspect, a development system is provided. The system includes means for representing a current state of a database system (e.g., model 120) and means for capturing intentions associated with updating the database system (e.g., metadata 160). The system also includes means for determining updates to the database system in view of the captured intentions (analyzer 130) and means for deploying updated code to the database system (e.g., deployment engine not shown).

Figure 2:
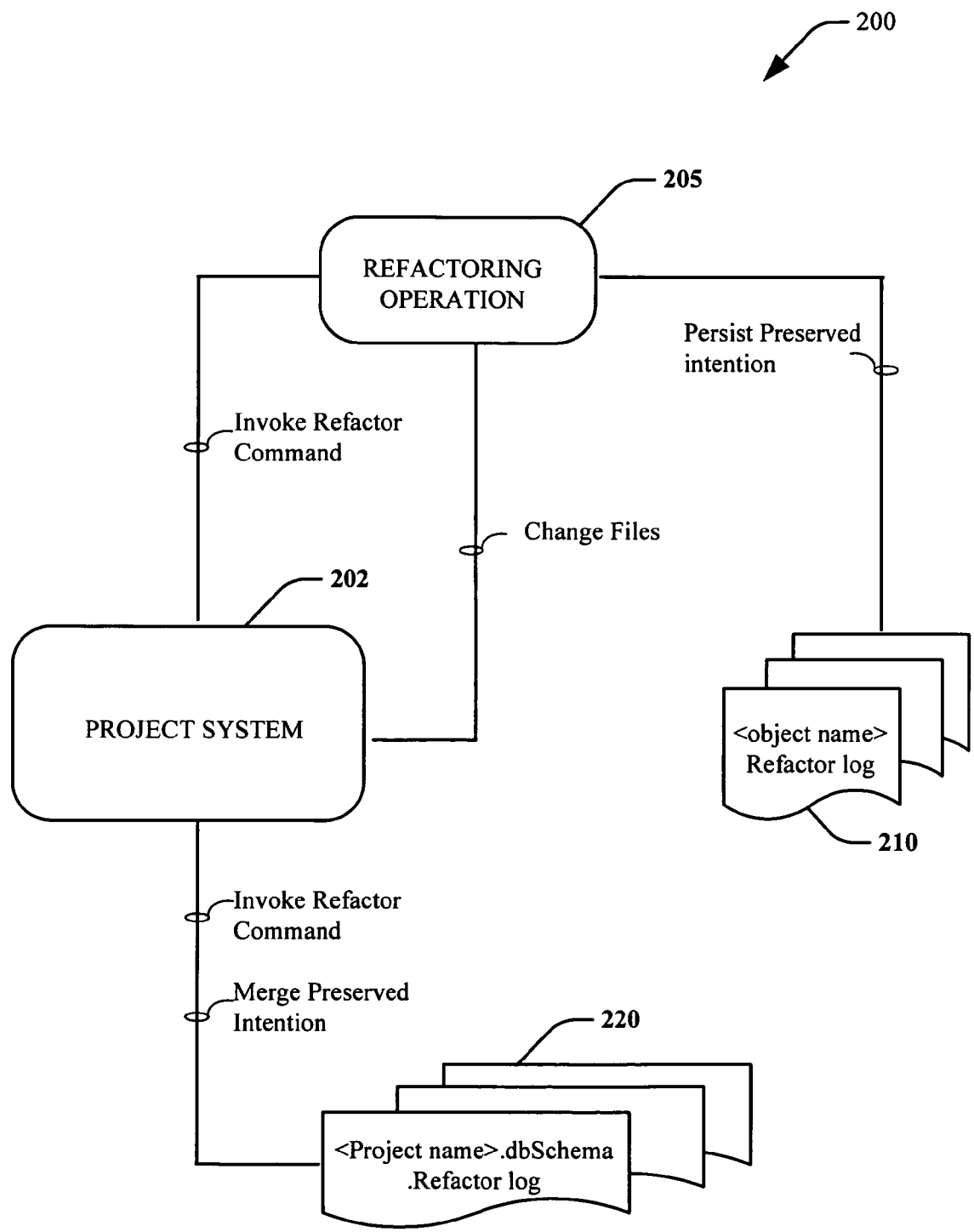
FIG. 2 illustrates an exemplary block diagram of a system that facilitates end user interaction with a project system to enable a refactoring operation.

Referring now to FIG. 2, an exemplary system 200 is illustrated that facilitates end user interaction with a project system 202 to enable a refactoring operation 205. As shown, the refactoring operation 205 may update a log 210, where the project system 202 maintains a schema 220. In general, a refactoring operation 205 (or an ambiguous operation) refers to a modification or change to source code that when performed is not obvious from the resulting file. For example, when the nature of a modification cannot be readily discerned from the source code, such as; when a name of a table changes from an old name to a new name it is not clear whether a table with the old name should be dropped and a table having the new name should be added—or alternatively a rename should merely occur. In contrast, adding a column to a table is not deemed a refactoring operation, since a comparison with a previous script clearly indicates that a column has been added, and hence the nature of the change is obvious from the source code.

In a related aspect of capturing and preserving user intent, when a user refactors an object in the model, preserved intentions can be created for such action and recorded in a log 220 for that object. For example, a notation of the action is performed, and other metadata (e.g., GUID) that uniquely identifies the action as well as other reference metadata can be generated and stored. It is to be appreciated that for a majority of modifications performed by a user to the model, the intent of the user's changes to the model can be discerned unambiguously when comparing the build output with the reverse-engineered target database. For example, if a particular table in the model has an additional column that is not present in same table in the reverse-engineered target database, the intent of the user's modification (namely, to add a column to the table) is clear, without the aid of a preserved intent entry. The generated deployment script can also contain an ALTER TABLE . . . ADD COLUMN statement. Likewise and as explained earlier, refactoring operations performed by a user are not cleanly discernable from a comparison of the build output with the reverse-engineered target database.

Moreover, such refactoring operation is responsible both for changing the sources of the project at design time and for documenting the operation in the log 220. The refactoring operation log entries can be retained as part of the project and are checked-in if the project is under source code control. The user's intent to perform a refactoring operation can be signaled through the user interface (e.g., right-click on object, select "Rename . . . " from drop-down menu).

Accordingly, when a user completes modification of a project, such changes can be checked back into the source code control system, wherein upon completion of such check-in the model can be constructed and subsequently deployed to a selected target database. In addition to the current states of the sources, the refactoring operations are also included in the output of the build that can be subsequently employed for deployment.

Figure 3:
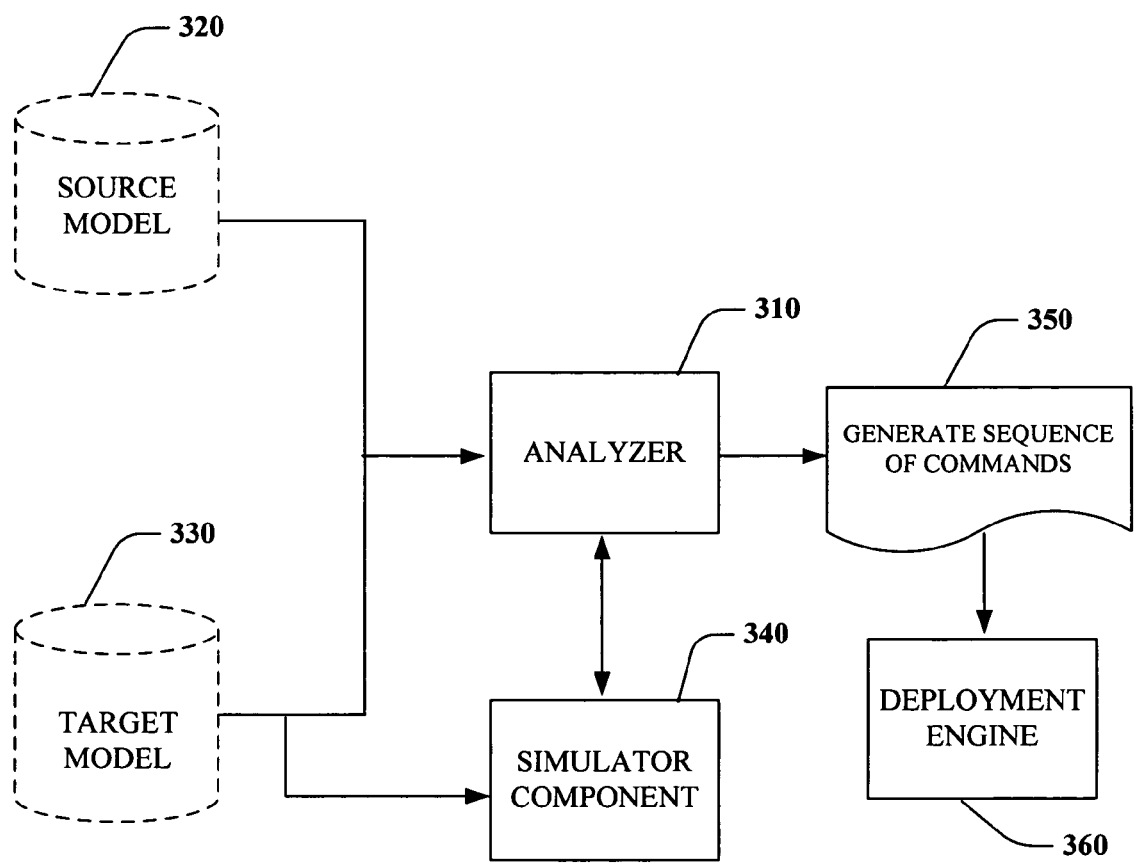
FIG. 3 illustrates an exemplary deployment system.

Referring now to FIG. 3, a deployment system 300 is illustrated that utilizes the captured or preserved user intentions and models described above. The system 300 includes an analyzer 310 that processes one or more models, where in this example, a source model 320 and a target model 330 are analyzed. A simulator component 340 is employed to run speculative sequences from the analyzer 310, where one or more commands 350 are generated. The commands 350 are then utilized by a deployment engine 360 to update a respective database with changes that have occurred over time.

In one aspect, the system 300 employs various methods for updating a respective database with potential changes. This includes a deployment method or process that models a target artifact 330 by one or more analyzing components 310 responsible for production of a sequence of commands 350 to modify the target artifact 330. The method includes executing one or more speculative changes to the target artifact 330 in order to simulate results of an execution of one or more produced commands 350 to modify the target artifact, in order to simplify an analysis or improve results of subsequent analysis by similar or different analyzing components 310. The target artifact 330 can be a target database or target model, where the target model represents a schema of the objects included within the target database. The source model 320 represents a goal state for object schemas within a database modeled by the target model 330.

Other methods include comparing the source and target models and/or analyzing preserved user intent to produce the sequence of commands 350 to modify the target artifact. This can also include employing a current-state source representation of a database schema, for example. In another aspect, changes can be accumulated that are accompanied by preserved user intent for deployment as part of a single operation. Also, analyzing components contributed by third parties through an extensibility feature can be provided. The methods also include changing a target database to reflect a current-state source representation, collapsing a plurality of similar change commands 350, or collapsing a plurality of change commands into a single command.

The deployment aspects can include publication of a sequence of commands 350 sufficient to modify the target database server, wherein a schema associated therewith matches that of the source—(e.g., the publication can include: commands being sent to the target database server for subsequent execution, wherein the server's schema can be brought into agreement with the source; scripting commands to a text file in predetermined location, such as a well defined location wherein end users can review such commands, followed by sending them to a target server for execution at a subsequent time.) Hence, deployment can involve changing the target database such that it reflects the current-state source representation. It is noted that the current state representation need not be limited to a project but could also relate to some other construct representing a current database schema for example a temporary or scratch database, XML document, and so forth. In a related aspect, during a process of producing changes for execution at deployment, the model of a target 330 is changed in order to reflect the preserved intent (e.g., a speculative change), wherein such model can represent an in-memory structure that facilitates analysis for state of affairs related to execution of changes to the target. As such, before actually executing changes to the target system, a speculative change is performed on the model for the target that reflects an intended outcome that is desired. Such speculative change to the target model can suppress unwanted changes resulting from direct comparison of the source and target models or other subsequent analysis. Hence, models for both the source representation 320 and the target representation 330 can be analyzed to produce appropriate changes.

Figure 4:
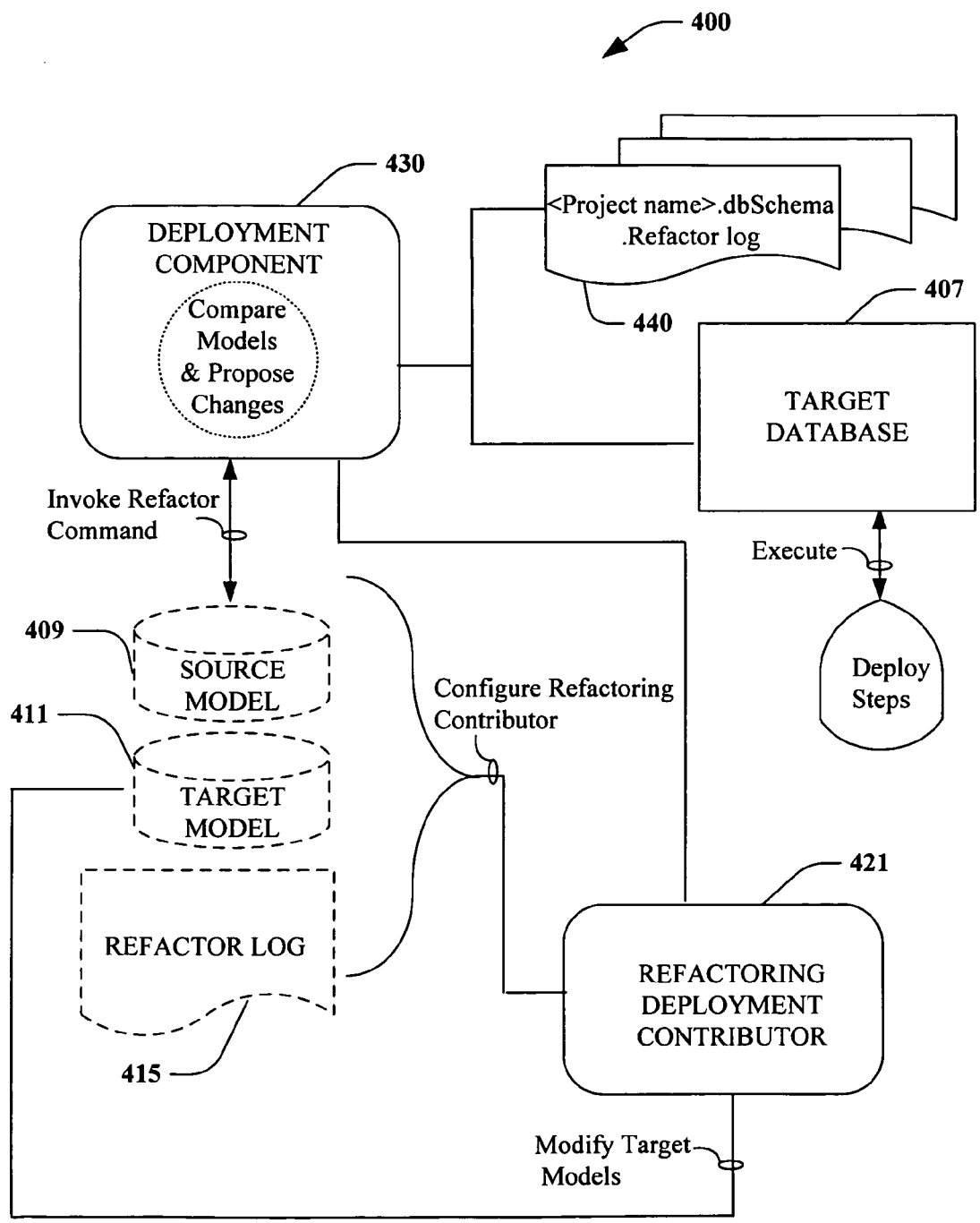
FIG. 4 illustrates a deployment of modifications to a database server.

Turning to FIG. 4, a system 400 is illustrated that can be implemented as part of a deployment stage. The system 400 can devise a series of operations that synchronizes a model of a build output with a representation of the target database 407 such as with a target model 411. For example, the source model 409 and the target model 411 can be the same; except for that in the source model 409 there exists a table named "foo", and yet in the target model 411 the same table is named "bar." As such, one goal of the deployment for the system 400 is to change the name and rename the table "bar" to "foo", based on a log 415. Such log 415 facilitates preservation of user intent, wherein there also exists a single entry that indicates a rename operation that the end user performed when an associated script was being modified.

As illustrated in FIG. 4, the target database 407 is also loaded and modeled into the memory with the name of a new table. Subsequently, the two models and the log 415 can be passed into a refactoring deployment contributor component 421, which recognizes the discrepancies in the two models that are the result of the log 415 entry that is renamed. Hence, by analyzing the log entry, the refactoring deployment contributor 421 can suggest a rename to a deployment engine 430. It is to be appreciated that the refactoring deployment contributor 421 can be extensible to support extensions that generate required modifications to the database, (e.g., plug-ins, .NET components, JAVA, and the like) for example. Moreover, the refactoring deployment contributor component 421 can further propose modifications (e.g., a rename)—wherein a proposed action further triggers additional actions and/or not be performed at all due to conflicts. The refactoring deployment contributor component 421 can initially read preserved intention operations from a local file/cache and further retrieve already executed operations from the target. A list of proposed operation can then be generated. The deployment engine 430 can loop through list of proposed operations (e.g., logical action, physical script).

The system 400 preserves user intentions when invoking a change and performing modifications to a source code representation of a database, for subsequent clarification of ambiguous operations at deployment time (e.g. discerning different operations that can end in same results in a script.) Absent such system, at time of changing the "bar" table to "foo"—no intent is preserved in the script, and thus there remains no additional knowledge regarding user intention. Hence, at deployment time, loading occurs for the model of the target database 407 and the loading of a DB schema 440 and the output of the build, without presence of the refactoring log 415 that preserves the meaning of the operation. Accordingly, the deployment engine 430 merely has two models (or more) to work with, wherein no log or refactoring deployment contributor exists.

Absent preserving user intent, the deployment in the comparison operation realizes presence of the "foo" table in one model, and in the other model there exists the "bar" table, and hence it recognizes such as the drop of one table and the creation of another table. Accordingly, such drop and create operations can be placed in the pipeline—along side any alterations of the view that can bind to other tables. Such can result in loss of data and further induce complexities due to presence of other binding to the dropped table.

According to one aspect of the subject innovation, initially a model representation of the target database 407 can be supplied (e.g., reverse engineered.) Contents of the target database's log 415 can then be compared with log contents contained in the build output. Preserved intentions existing in the build output that are not available in the target database's log can represent refactoring operations that have not yet been applied to the target database. Such comparison is straightforward and can be readily performed, since each preserved intention entry is uniquely identified.

The log 415 for each object can further be scanned and multiple operations or redundant operations (such as a CREATE INDEX some_name on a table followed later by a DROP INDEX some_name on the same table) collapsed into single operations reflecting the cumulative effect on state of the object, wherein the temporary log is discarded. Moreover, contributor operations that have not yet been applied to the target database 407 are passed to the appropriate contributor handler, which applies the operation to the model representation of the target database. Such speculative change to the target model 411 can suppress unwanted changes resulting from direct comparison of the source and target models, for example. The contributor handler 421 also generates the appropriate modification action necessary to make the change to the target database (e.g., sp_rename) and adds this code to deployment plan. Additionally, modification code can be generated to add the unique identification to the target database's log 415 (signifying that the preserved intention has been applied to the database). Since the contributor handler is specific to a particular operation (e.g., the RENAME refactoring contributor), it can leverage database system-specific strategies that can be available for that operation. In addition, the handling of the contributor operations are cumulatively referred to as the deployment pipeline and is designed to be extensible to include third party-provided modification actions. The extensible deployment pipeline could define a high-level "language" for describing changes in a deployment plan that will ultimately translate to a deployment script.

As such, operations that required understanding of the user's intent (the contributor operations) have been applied to the model representation of the target and have also had modification actions added to the deployment plan (and ultimately, to the deployment script). The remainder of the modification code to be generated can be determined unambiguously from the differences between the build model and the updated target model, wherein such modification actions can also be applied to the deployment. The deployment script is then run against the target database.

Figure 5:
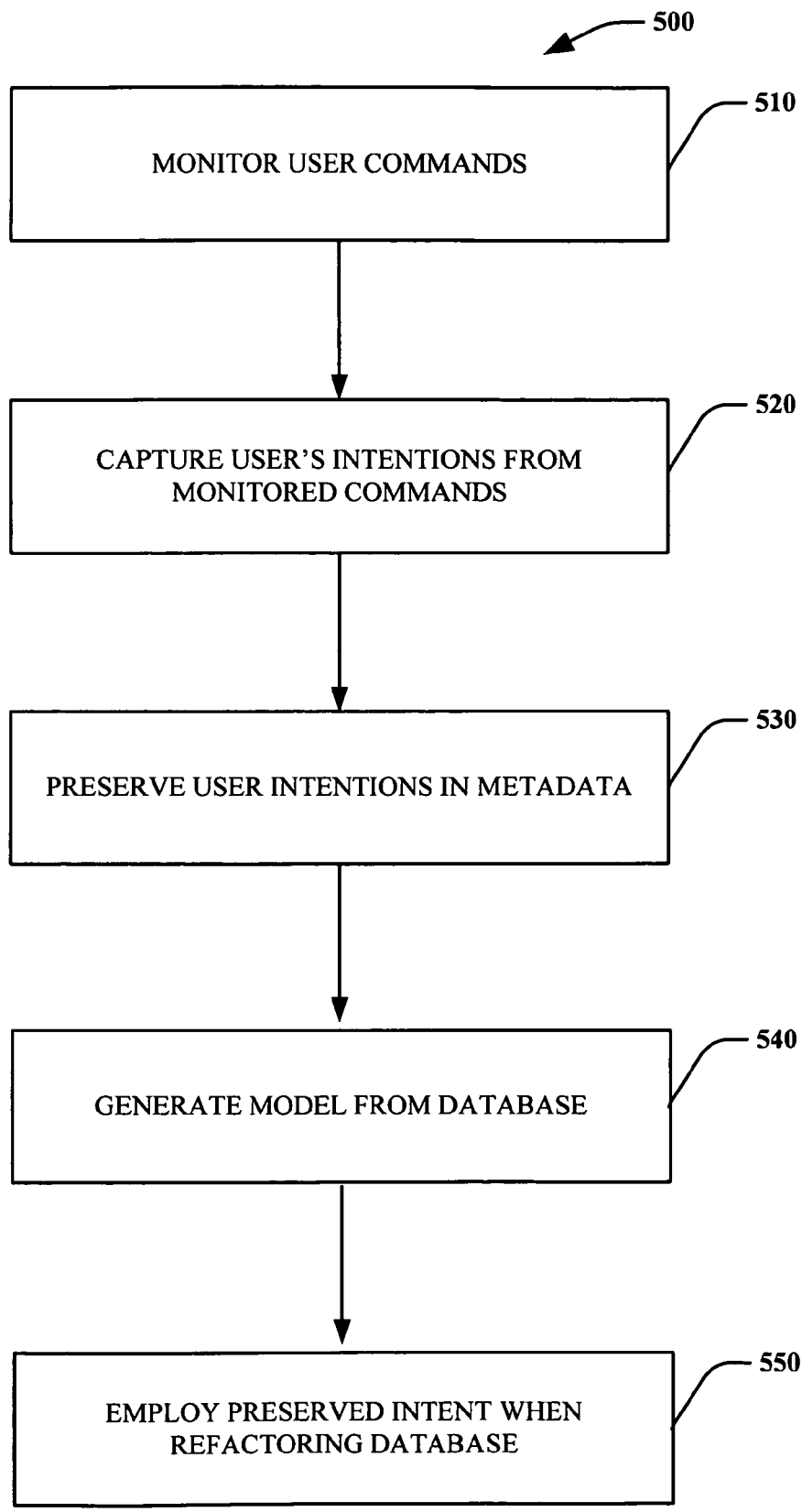
FIG. 5 illustrates a methodology of preserving user intent in view of updates to a database system.
Figure 6:
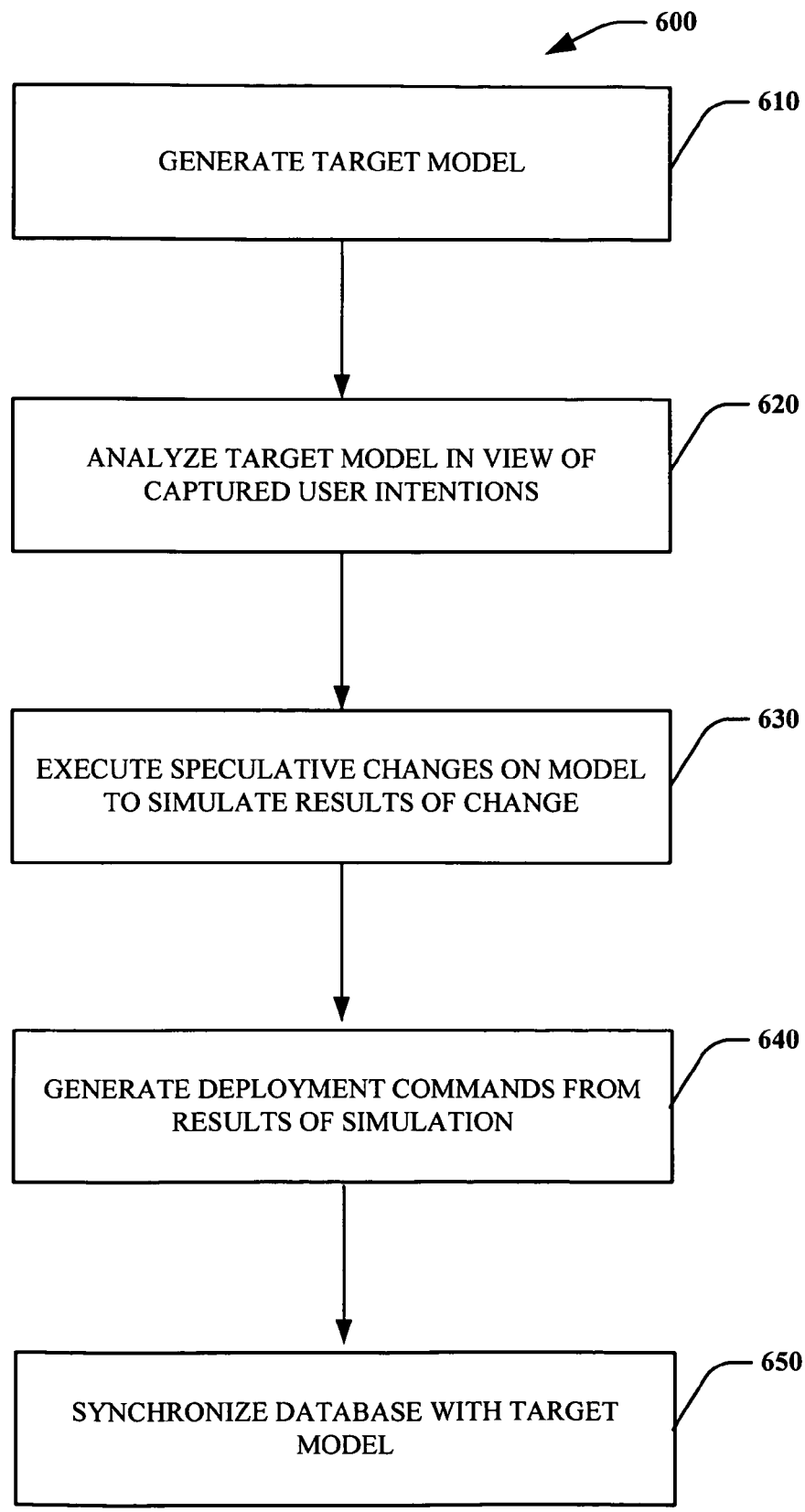
FIG. 6 illustrates a methodology of deploying database updates in view of simulations that are run against target and source models.

FIGS. 5 and 6 illustrate methods for refactoring a running database system. While the methods are illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Referring to FIG. 5, a methodology 500 provides a process where user intentions are captured and employed to facilitate refactoring of a database system. Proceeding to 510, user commands are monitored. This can include monitoring change requests that are explicitly directed to a development user interface. For example, monitoring specific change commands, key strokes, interface selections such as which menu options or tool bar features are selected. At 520, user intentions are captured form the monitored commands. Intentions may be explicit such as rename or delete a particular row or column, for example. As noted previously, intentions can also be inferred from detected user context and actions when interacting with a respective development system. At 530, captured user intentions are preserved in metadata that is saved along with source code for the database system. At 540, a model is generated from the database. As noted previously, this can include an automated reverse-engineering analysis where database instructions are analyzed and a source code model is automatically generated from the analysis and corresponding instructions. At 550, preserved user intentions are then employed to refactor a running database system.

In general, the method 500 can be implemented on a database development system, where the system includes a current-state source representation of a database. The system also includes a metadata component that preserves user intentions that describe when a user interacts with the system to perform a refactoring operation associated with the database and for use in subsequent operations by the system. The system can include a deployment component that utilizes preserved user intentions to optimize production of a sequence of commands to modify a schema associated with a target database for comparison with a current-state source representation. A persisted representation of user intentions for clarification of ambiguous operations can also be provided. A user interface in the form of a menu, button or user interface element can be presented to facilitate execution of a change to the current-state source representation including indication of the user's intent.

A build output can be provided that represents a collection of preserved user intentions and a current state of a database. This can include a unique identifier that identifies an action performed on the current-state source representation, where preserved user intentions are persisted on a target database for which deployment commands have been executed. An extensibility component employed by third parties can be provided for enabling extension of preserving intentions of previously unsupported refactoring operations. A human-readable persistence of a user's intent can be generated. Also, a user modification of persisted user intentions can be generated after persistence but before subsequent use by other portions of the system.

Referring to FIG. 6, a methodology 600 is provided for deploying target model information that has been aggregated or otherwise processed by a development system. Proceeding to 610, a target model is generated from the database. As noted previously, this can include an automated reverse-engineering analysis where database instructions are analyzed and a source code model is automatically generated from the analysis and corresponding instructions. At 620, the generated model is analyzed in view of the captured user intentions which have been stored as metadata. At 630, speculative changes on the model based on the user intentions or other factors can be executed. The executed changes on the model drive simulations to determine system or performance impacts indicated by the respective changes. At 640, one or more deployment commands are generated from the results of the simulation. At 650, a database is synchronized with the target model by updating the database with the changes that have occurred in the respective model over time.

The method 600 includes analyzing a model of a target artifact in order to produce a sequence of commands to modify the target artifact. This includes executing one or more speculative changes to the model of the target artifact in order to simulate results of an execution of one or more produced commands to modify the target artifact. The target artifact can be a target database or target model, where the target model represents a schema of the objects included within the target database. A source model represents a goal state for object schemas within a database modeled by the target model. Other methods include comparing the source and target models and/or analyzing preserved user intent to produce the sequence of commands to modify the target artifact.

Figure 7:
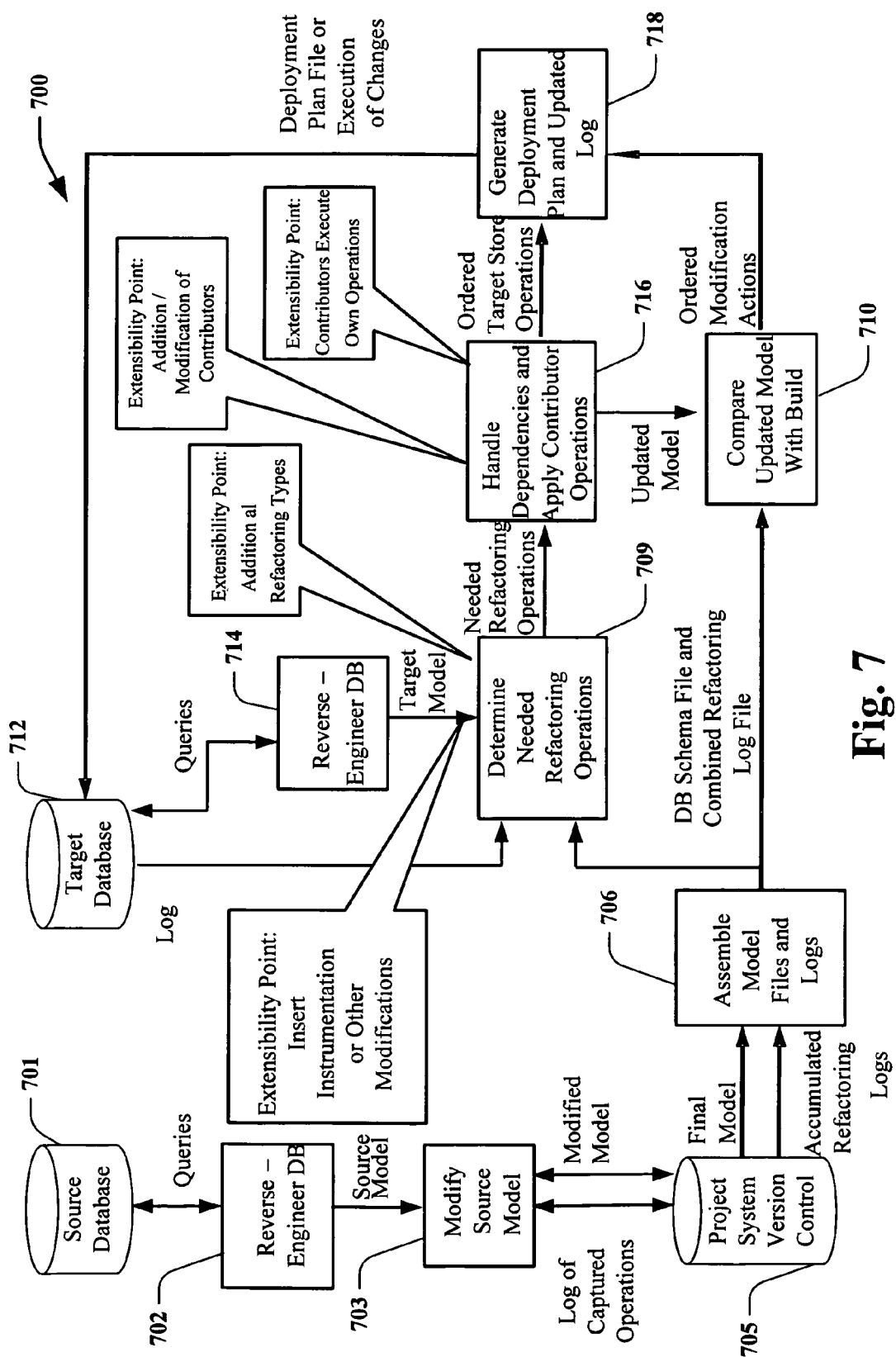
FIG. 7 illustrates an example system that employs preserved user intentions

Referring now to FIG. 7, an example system 700 is illustrated for refactoring database systems. A source database 701 is reverse-engineered via one or more queries at 702 to determine a source model at 703 that can be subsequently modified over time. The source model 703 can be checked into a version control system 705 that also maintains a log of captured operations or intentions in addition to the modified source model 703. From the version control system 705, an assembled model 706 is created from a final model stored on the version control system and from accumulated refactoring logs. Output from the assembled model 706 is presented to a determination process 709 and a compare process 710. A target database 712 is reverse engineered at 714 via one or more query instructions. A log can also be retrieved from the target database 712. The determination process 709 analyzes the target model and the source model to determine refactoring operations. Dependencies are processed at 716 from the determination process 709, where contributor operations are also applied at 716. The compare process 710 compares the updated model with a build component, where a deployment plan is generated at 718. An updated log can also be generated at 718. The target database 712 is then synchronized from the respective models by commands generated in the deployment plan at 718.

Figure 8:
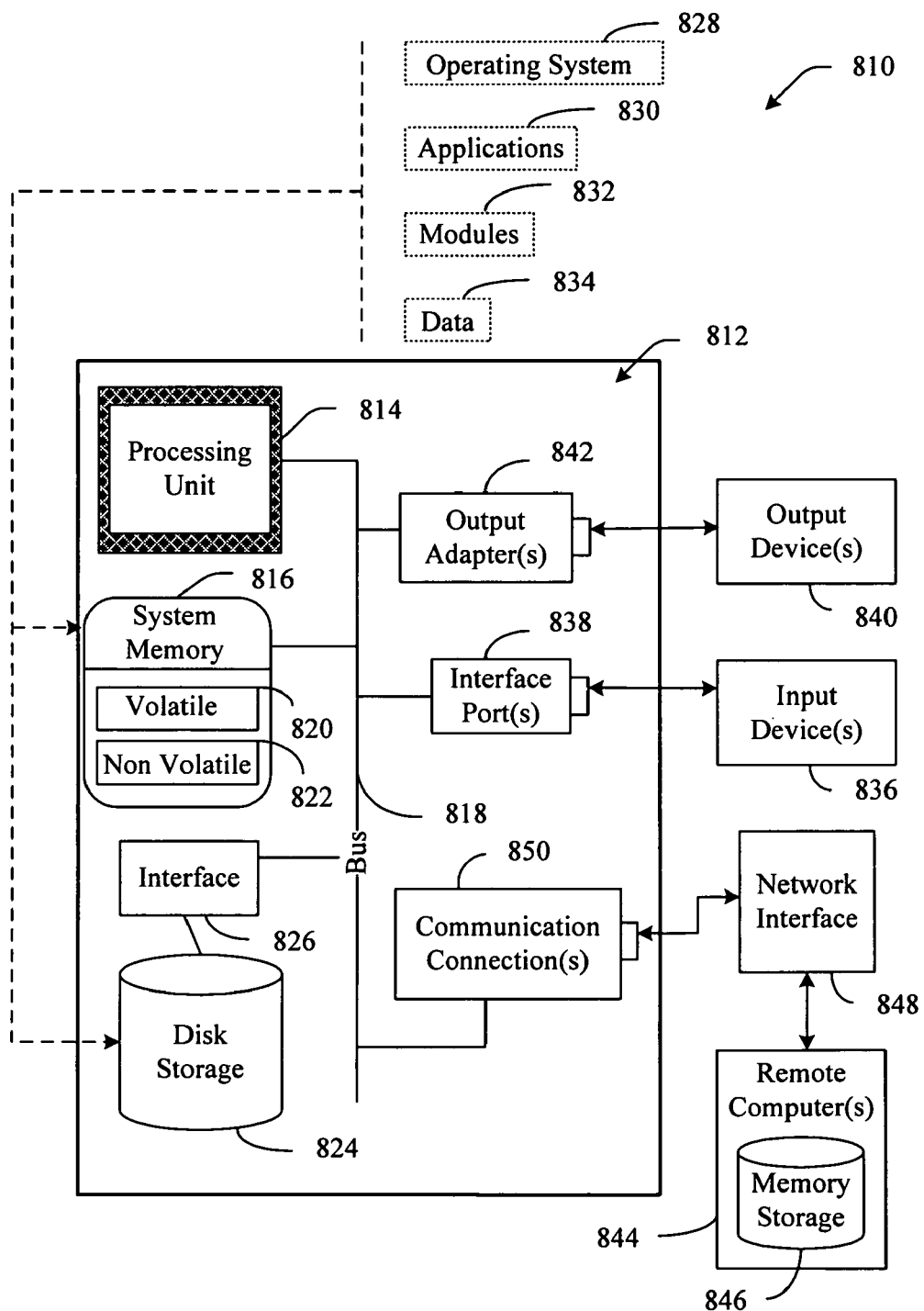
FIG. 8 illustrates a schematic block diagram of a suitable operating environment.
Figure 9:
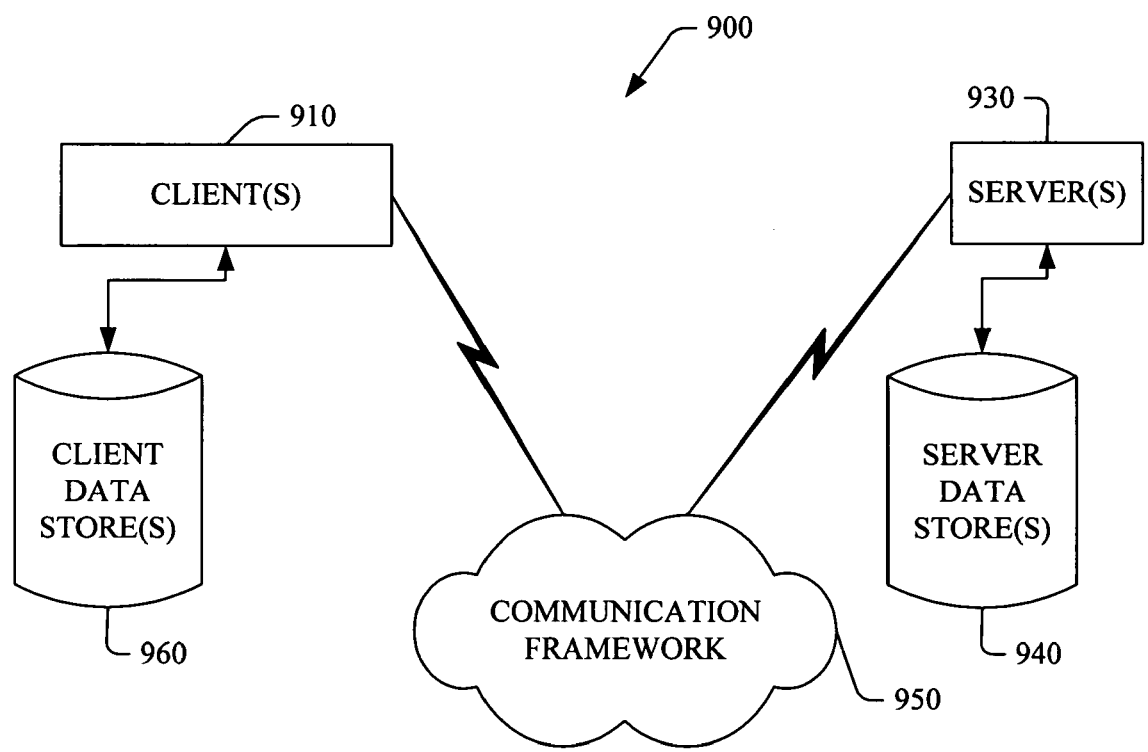
FIG. 9 illustrates a further schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 8, an exemplary environment 810 for implementing various aspects of the subject innovation is described that includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates a disk storage 824, wherein such disk storage 824 includes, but is not limited to, devices like a magnetic disk drive, floppy disk drive, tape drive, Jaz drive, Zip drive, LS-60 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed as part of preserving intent in accordance with an aspect of the subject innovation. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented within a computer system that includes one or more processors and memory storing instructions which, when executed by the one or more processors, implement the method for modeling and simulating changes to a target database, the method comprising:

generating a source model of a target database that comprises an offline source code representation of an original schema of the target database;

modifying the source model with at least one refactoring operation that modifies the original schema to arrive at a modified schema, while preserving user intent of the at least one refactoring operation by monitoring one or more user actions performed via a developer user interface, the preserved user intent resolving ambiguities between a plurality of refactoring operations that could bring about the modified schema;

generating a target model of the target database, wherein the target model comprises a source code representation of a current schema of the target database;

analyzing the source model and the target model in order to produce one or more commands to modify the current schema of the target model to match the modified schema of the source model, the one or more commands including at least one command derived from the preserved user intent, wherein the producing of the one or more commands comprises collapsing a plurality of change commands used when modifying the source model into a single command by referring to a refactoring log; and executing one or more speculative changes to the target model in order to simulate results of an execution of the one or more produced commands to modify the target model, wherein generating the source model and/or generating the target model comprises an automated reverse-engineering of the target database via one or more queries on the target database.

2. The method of claim 1, wherein producing one or more commands comprises accumulating changes that are accompanied by preserved user intent for deployment as part of a single operation.

3. The method of claim 1, wherein analyzing utilizes analyzing components contributed by third parties through an extensibility feature.

4. The method of claim 1, further comprising deploying the one or more produced commands to the target database so that the target database reflects the modified schema.

5. The method of claim 1, wherein the current schema of the target database and the original schema of the target database are the same, and wherein the one or more produced commands modify the current schema to match the modified schema.

6. The method of claim 1, wherein modifications to the source model are managed with a version control system.

7. The method of claim 1, wherein the current schema of the target database and the original schema of the target database are different.

8. The method of claim 7, further comprising preserving user intent of at least one refactoring operation made directly to the target database to bring about the current schema.

9. The method of claim 7, wherein the one or more produced commands synchronize the current schema and the modified schema.

10. A computer system for implementing a method for modeling and simulating changes to a target database, the computer system comprising:

one or more processors; and one or more computer storage media having stored thereon computer executable instructions that, when executed by the one or more processors, implement the method comprising:

generating a source model of a target database that comprises an offline source code representation of an original schema of the target database;

modifying the source model with at least one refactoring operation that modifies the original schema to arrive at a modified schema;

preserving user intent of the at least one refactoring operation by monitoring one or more user actions performed via a developer user interface, the preserved user intent resolving ambiguities between different refactoring operations that could independently bring about the modified schema;

generating a target model of the target database, wherein the target model comprises a source code representation of a current schema of the target database;

analyzing the source model and the target model in order to produce one or more commands to modify the current schema of the target model to match the modified schema of the source model, the one or more commands including at least one refactoring command selected, at least in part, based on the preserved user intent, wherein the producing of the one or more commands comprises collapsing a plurality of change commands used when modifying the source model into a single command by referring to a refactoring log; and simulating one or more speculative changes on the target model in order to simulate results of an execution of the one or more produced commands to modify the target model, wherein generating the source model and/or generating the target model comprises an automated reverse-engineering of the target database via one or more queries on the target database.

11. The computer system of claim 10, further comprising deploying the one or more produced commands to the target database so that the target database reflects the modified schema.

12. The computer system of claim 10, wherein the current schema of the target database and the original schema of the target database are the same, and wherein the one or more produced commands modify the current schema to match the modified schema.

13. The computer system of claim 10, wherein preserving user intent of the at least one refactoring operation comprises differentiating one or more refactoring operations which could be used to modify the original schema to arrive at the modified schema from at least one or more other refactoring operations could also be used to modify the original schema to arrive at the modified schema.

14. The computer system of claim 10, wherein the current schema of the target database and the original schema of the target database are different.

15. The computer system of claim 14, further comprising preserving user intent of at least one refactoring operation made directly to the target database to bring about the current schema.

16. The computer system of claim 10, wherein the at least one refactoring command that is selected, at least in part, based on the preserved user intent comprises a refactoring command selected instead of a different refactoring operation that could also be used to modify the current schema of the target model to match the modified schema of the source mode.

17. One or more computer storage media having stored thereon computer executable instructions that, when executed by one or more processors of a computer system, implement a method for modeling and simulating changes to a target database, the method comprising:

querying a target database to generate a source model that comprises an offline source code representation of an original schema of the target database;

modifying the source model with at least one refactoring operation that modifies the original schema to arrive at a modified schema, while preserving user intent of the at least one refactoring operation by monitoring one or more user actions performed via a developer user interface, the preserved user intent resolving ambiguities between a plurality of refactoring operations that could bring about the modified schema;

querying the target database to generate a target model, wherein the target model comprises a source code representation of a current schema of the target database;

analyzing the source model and the target model in order to produce one or more refactoring commands to modify the current schema of the target model to match the modified schema of the source model, the one or more refactoring commands including at least one refactoring command derived from the preserved user intent, wherein the producing of the one or more commands comprises collapsing a plurality of change commands used when modifying the source model into a single command by referring to a refactoring log; and executing one or more speculative changes to the target model in order to simulate results of an execution of the one or more produced commands to modify the target model, wherein generating the source model and/or generating the target model comprises an automated reverse-engineering of the target database via one or more queries on the target database.

* * * * *